United States Patent [19]

Herzberger et al.

[11] Patent Number: 5,276,689
[45] Date of Patent: Jan. 4, 1994

[54] DEMULTIPLEXER FOR AN ISOCHRONOUS MULTIPLEX SIGNAL

[75] Inventors: Achim Herzberger, Nürnberg; Paul Presslein, Ebermannstadt, both of Fed. Rep. of Germany

[73] Assignee: U.S. Philips Corporation, New York, N.Y.

[21] Appl. No.: 783,294

[22] Filed: Oct. 28, 1991

[30] Foreign Application Priority Data

Oct. 29, 1990 [DE] Fed. Rep. of Germany ....... 4034354

[51] Int. Cl.⁵ .......................... H04L 5/22; H04J 3/04
[52] U.S. Cl. ..................................... 370/112; 328/105
[58] Field of Search .................. 370/112, 105.1, 105.4; 307/244; 328/62, 105

[56] References Cited

U.S. PATENT DOCUMENTS

| | | |
|---|---|---|
| 4,542,503 | 9/1985 | Fladerer et al. ................. 370/105.1 |
| 4,949,339 | 8/1990 | Shimada et al. ..................... 370/112 |
| 5,150,364 | 9/1992 | Negus ................................... 370/112 |

FOREIGN PATENT DOCUMENTS

| | | |
|---|---|---|
| 5071990 | 9/1990 | Australia . |
| 0386828 | 2/1990 | European Pat. Off. . |
| 3907050 | 9/1990 | Fed. Rep. of Germany . |
| 61-29226 | 2/1986 | Japan . |

OTHER PUBLICATIONS

CCITT Recommendations G.707, G.708 and G.709.

Primary Examiner—Douglas W. Olms
Assistant Examiner—Hassan Kizou
Attorney, Agent, or Firm—Anne E. Barschall

[57] ABSTRACT

A demultiplexer for an isochronous multiplex signal is described which signal consists of isochronous sub-signals interleaved block by block. The demultiplexer comprises a read-write memory (MXA, MXB, MXC, MXD) as well as a read-write control (ST). The proposed circuit arrangement may be devised in a highly advantageous manner as an integrated circuit because it is has been considered that, for example, the manufacturers of gate arrays leave the user only the choice of using building blocks depicted in a catalogue. These building blocks constitute the function blocks (MXA to MXD) which are provided for partitioning an STM-16 signal into four sub-signals (STM4A, STM4B, STM4C, STM4D). The control signals for these function blocks (TL15:0, Z(3:0), T311, T622) are produced by a control circuit (ST) whose central module is a four-stage cyclic counter. The necessary control signals are derived from the count of the cyclic counter by means of addressable demultiplexers.

10 Claims, 5 Drawing Sheets

DEMULTIPLEXER FOR AN ISOCHRONOUS MULTIPLEX SIGNAL

The invention relates to a demultiplexer for an isochronous multiplex signal that consists of isochronous sub-signals interleaved block by block, comprising a read-write memory and a read-write control.

A basic circuit diagram of such a demultiplexer is disclosed in, for example, German Patent Application DE 39 07 050. When such a demultiplexer is realised there are at least two possibilities. One possibility is that the demultiplexer is constituted by individual building blocks which have the desired function. Another possibility is that the demultiplexer is realised in integrated form in ECL technology. With the second possibility, however, an additional requirement should be heeded that, for example, the manufacturer of gate arrays leaves the user only the choice of using building blocks depicted in a catalogue. For example, 8:1 multiplexers, 4:1 multiplexers, 2:1 multiplexers, latches as well as flip-flops having eight, four or two inputs or latches and flip-flops having one input belong to such building blocks.

It is an object of the invention to provide a circuit of the type mentioned in the preamble while considering the above additional requirement, which circuit is suitable for use because of a low power consumption and because it requires little space on a chip.

This object is achieved using a read-write control which includes a multi-stage cyclic counter. Outputs of the counter stages are coupled to control inputs of a read-write memory of the demultiplexer. Outputs of the counters stages are also coupled to address inputs of addressable demultiplexers. The outputs of the addressable demultiplexers are coupled to further control inputs of the read-write memory. Further advantageous embodiments are discussed in the following.

The invention will be further explained with reference to an embodiment and its drawing Figures, in which.

Figure 1:
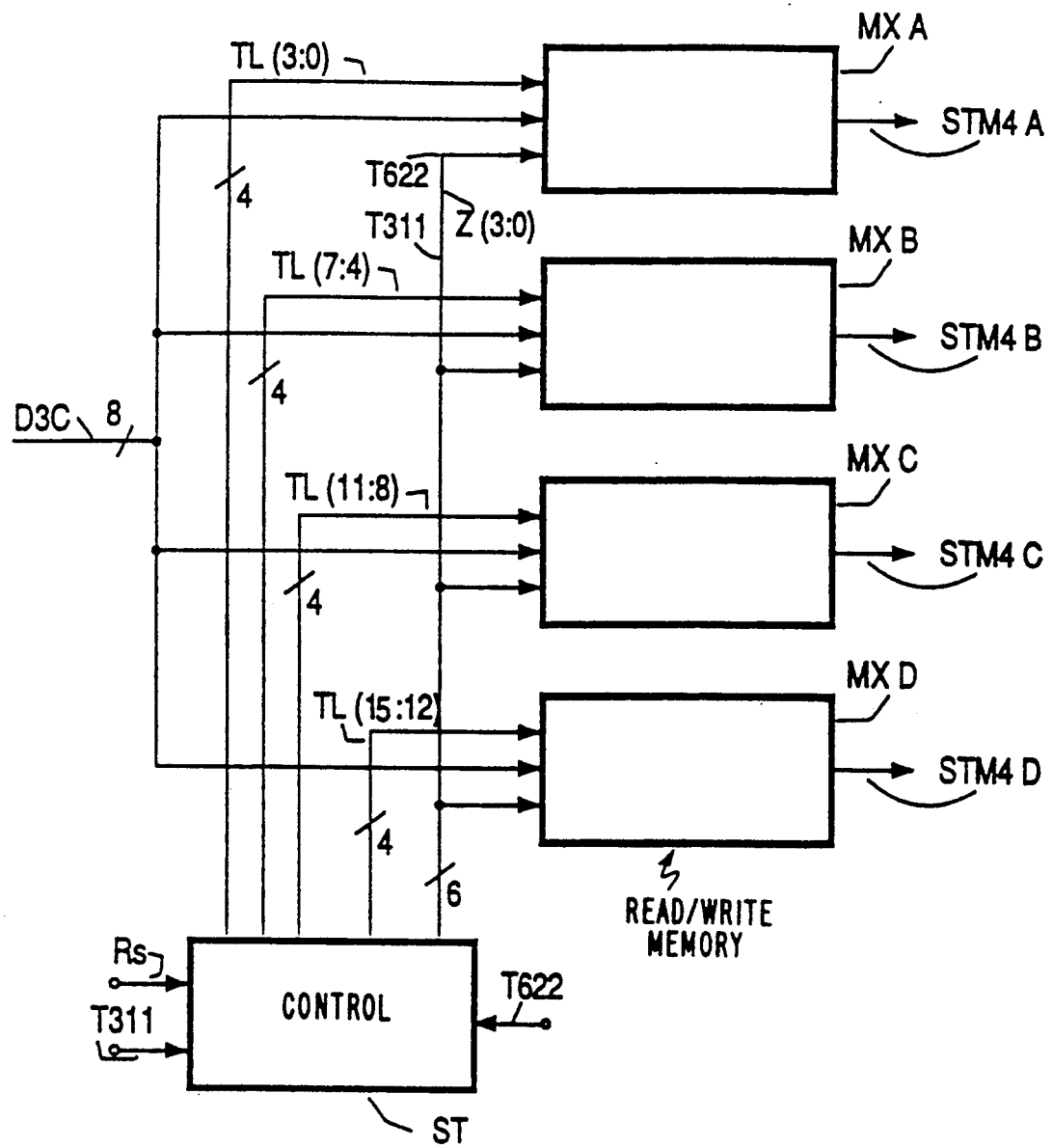
FIG. 1 shows a block diagram of a demultiplexer.

FIG. 1 is used for an outline of the demultiplexer. Over a line D3C (no distinction will be made hereinafter between the reference character for a line and that for a signal which is transmitted over the line concerned) eight parallel bits of an originally serial STM16 signal (cf. CCITT Recommendations G.707, G.708 and G.709) are simultaneously applied to four function blocks MXA, MXB, MXC and MXD. Collectively these function blocks constitute the read-write memory of the demultiplexer. The output signals of these function blocks STM4A to STM4D are the four isochronous sub-signals into which the isochronous multiplex signal has been partitioned. The input signal D3C is presequenced byte by byte, i.e. there is always in the same order a train of four consecutive bytes of the first, the second, the third and finally four bytes of the fourth sub-signal. This presequencing of the bytes and the partitioning of the originally serial multiplex signal into bytes is performed by means of a synchronization circuit not further discussed in this Application, which circuit may in essence be structured according to the circuit described in EP-A2-0 103 163 which corresponds to U.S. Pat. No. 4,452,503.

Two clock periods of a byte clock signal T311 before the first byte of the first sub-signal, a control circuit ST receives a reset pulse Rs from the synchronization circuit (not shown) which resets an internal counter of the control circuit ST (cf. below) to zero and which counter is then incremented with the byte clock T311. The control circuit ST produces successive clock pulses over clock lines TL0 to TL3 (for short TL(3:0)), with which four bytes of the first sub-signal are adopted in the function block MXA. Over control lines T622, Z(3:0) and the line T311 the function block MXA further receives clock signals and addresses for internal multiplexers and memories. This accordingly holds for the function blocks MXB, MXC and MXD as well as the further three sub-signals with clocks TL(7:4), TL(11:8) and TL(15:12). All function blocks further have identical structures. The byte clock T311 and the read clock T622 are produced by the synchronization circuit (not shown) by accordingly dividing (by 8, 4 respectively) the bit clock of the arriving serial multiplex signal (2.48832 GHz).

Figure 2:
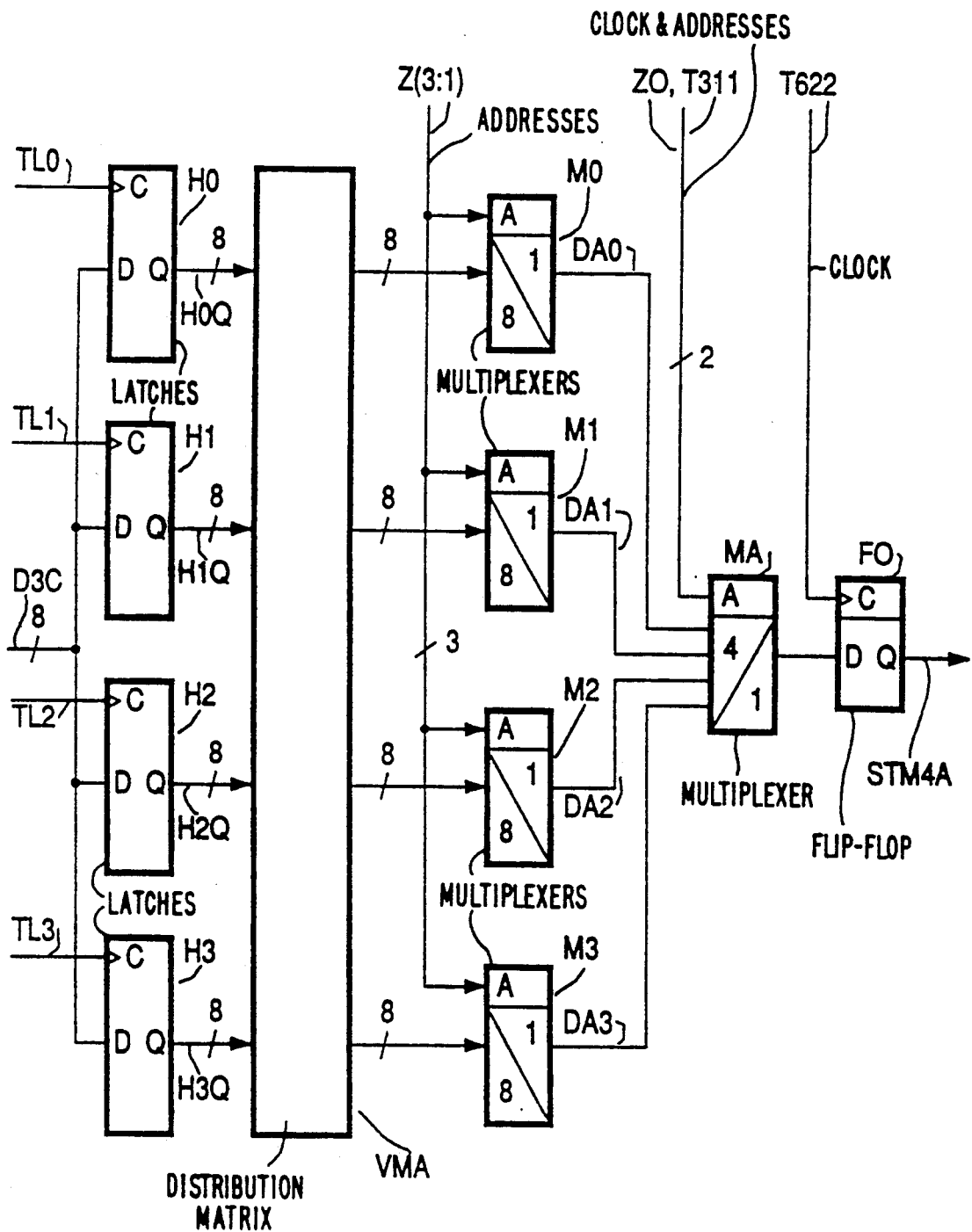
FIG. 2 shows the internal structure of a block as shown in FIG. 1.

FIG. 2 gives a detailed representation of the function block MXA. From the reference character one may detect how the circuit shown in FIG. 2 may be arranged in the general circuit diagram shown in FIG. 1. Four bytes of the signal D3C are successively fed to latches H0 to H3 with the clocks TL0 to TL3. The use of latches instead of flip-flops is advantageous in that a saving on room and energy as well heat dissipation may be realised.

The total of 32 outputs H0Q to H3Q of the latches H0 to H3 are connected to the total of 32 inputs of four 8:1 multiplexers M0 to M3 by means of a distribution matrix VMA whose exact structure will be described hereinafter. The outputs of the four 8:1 multiplexers are led to the inputs of a 4:1 multiplexer MA whose output signal is synchronized with a flip-flop F0 with a clock T622 (bit clock of the sub-signals). The distribution matrix VMA and the multiplexers M0 to M3 as well as MA are copies of a 32:1 multiplexer which is not given as a separate circuit in the above catalogue.

The distribution matrix VMA is constituted only by conductive sometimes crossing lines. For the crossings not to interfere, the lines are deposited on the chip in various wiring planes.

The multiplexers M(3:0) and MA are addressable. The addresses for the multiplexers M0 to M3 are conveyed over the lines Z1, Z2 and Z3 and the addresses for the multiplexer MA over the lines Z0 and T311. When an address is available at an address input of such a multiplexer, an input determined by the address is connected to the output of the multiplexer. All four multiplexers M0 to M3 are driven by means of the same address sequence. This address sequence and the connections of the outputs of the latches H0 to H3 to the inputs of the multiplexers M0 to M3 are mutually dependent and, therefore, are to be matched as will be explained in the following.

Figure 3:
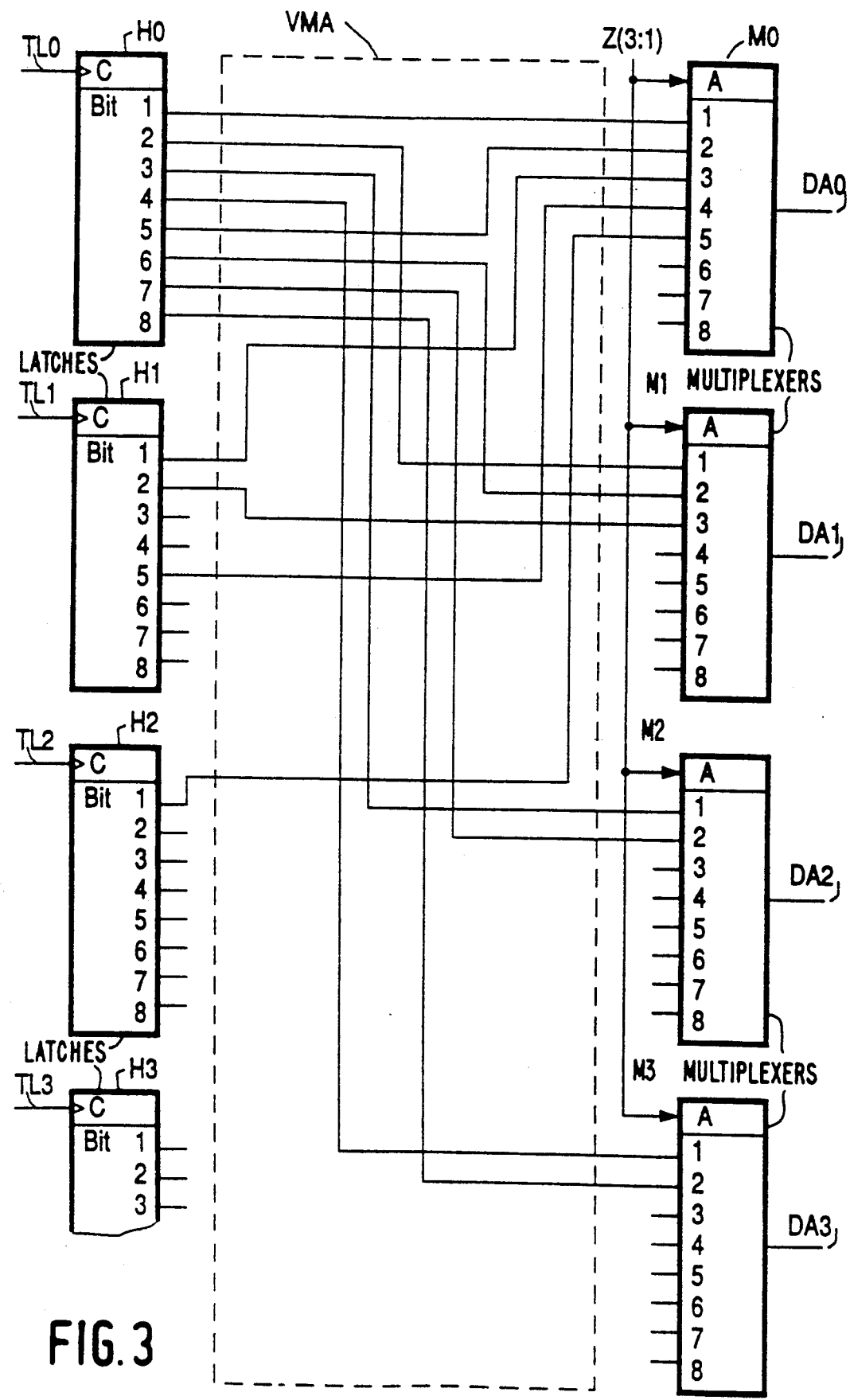
FIG. 3 shows the internal structure of a distribution matrix.

The first byte of the first sub-signal is stored in the latch H0. The first bit of this byte is stored in the top storage location of FIG. 2 (first storage location) of the latch H0, the second bit in the top but one location (second storage location) and so on up to the eighth bit which is stored in the bottom location (eighth storage location) of the latch H0. In the above sequence the bits are to appear in the output signal STM4A. For this purpose, each top (first) input of the four 8:1 multiplexers M0 to M3 is connected to the first, second, third, fourth output respectively, of the latch H0. The same holds for each second input of the four 8:1 multiplexers M0 to M3 and the remaining four outputs of the latch H0. Four consecutive inputs of the latches H1 to H3 are connected in like fashion to the inputs having like numbers of the multiplexers M1 to M3. These connections are represented only half for clarity in the distribution matrix VMA as shown in FIG. 3.

When the 8:1 multiplexers M0 to M3 in the described structure of the distribution matrix VMA are driven with the address as a result of which the first input is connected to the output of the multiplexer, the first four bits of the first byte are available at the four inputs of the 4:1 multiplexer MA. The address sequence on the lines Z0 and T311 now provides that the values of these first four bits are successively presented to the data input of the flip-flop F0 which then conveys these values synchronized with the bit clock T622 over the line STM4A. This being effected, the address on the address lines Z(3:1) changes, that is to say, to an address which connects the second inputs to the outputs of the multiplexers M0 to M3. In that case the last four bits of the first byte are presented to the inputs of the 4:1 multiplexer MA which are then conveyed serially over the line STM4A in accordance with the first four bits.

A corresponding handling is then effected with the bits of the last three bytes; subsequently, four new bytes are stored in the latches H(3:0) whose multiplexing is effected in the same pattern.

Figure 4:
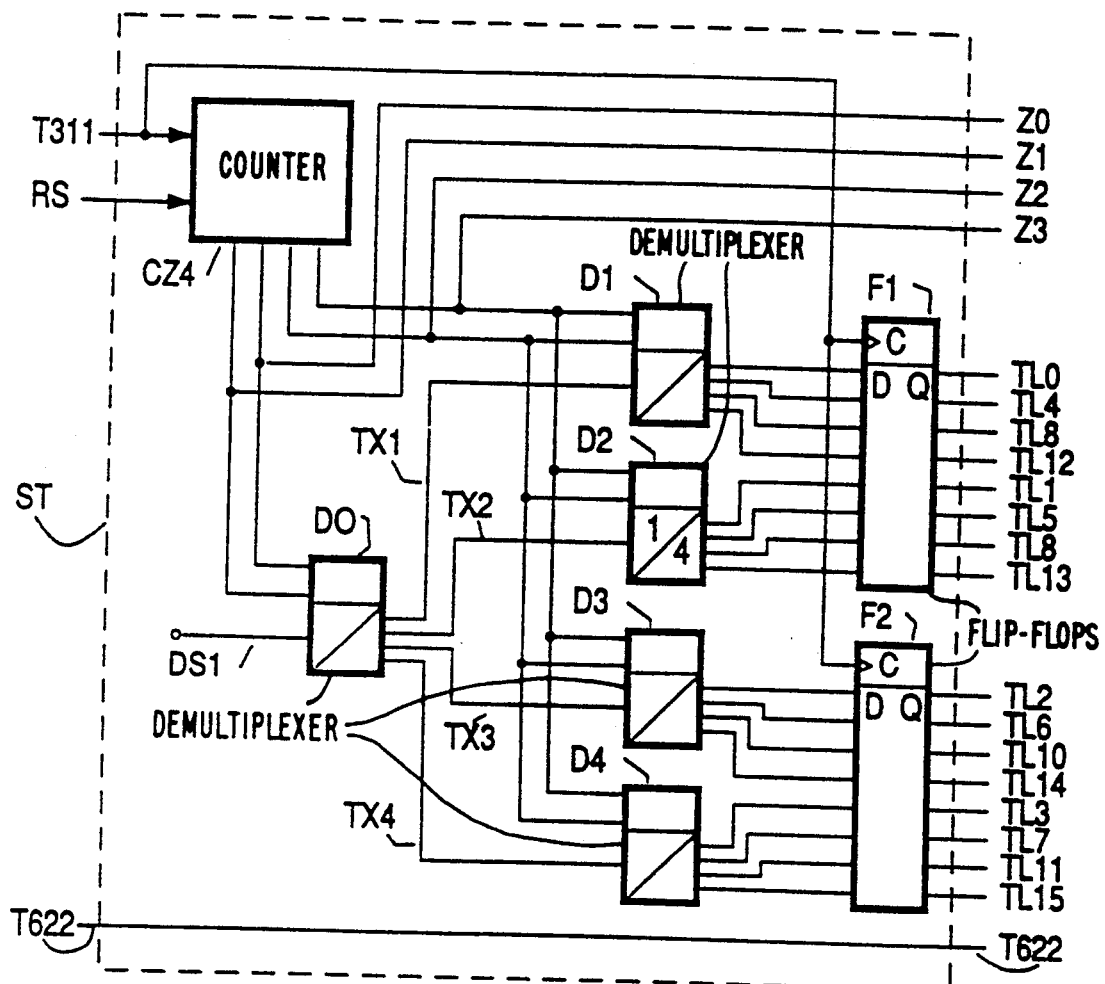
FIG. 4 shows a control unit for producing clock signals.

The clocks and addresses necessary for signal processing in the depicted time-coordinated fashion, are produced by the control circuit ST whose details are shown in FIG. 4. Again the reference characters for the input and output lines show how the control unit depicted in FIG. 3 can be arranged in the block diagram shown in FIG. 1.

A central building block of the control unit ST as shown in FIG. 4 is a cyclic four-stage counter CZ4 which is reset to zero by means of the reset pulse Rs and which is incremented with the byte clock T311.

The output signals of the four stages of the counter CZ4 are the signals Z0 to Z3 applied as addresses to the multiplexers M0 to M3 and MA. In the control unit ST itself they are used as addresses for 1:4 demultiplexers D0 to D4 and even the signals Z0 and Z1 as addresses for the 1:4 demultiplexer D0 and the signals Z2 and Z3 as addresses for the parallel- addressed demultiplexers D1 to D4. With the aid of the demultiplexers D0 to D4 pulses are distributed over the output lines TL(15:0). The clock line T622 is looped because this clock is not necessary for the control circuit itself.

A continuous "one" is available at the input DS1 of the demultiplexer D0, which "one" is physically realised by the high-voltage value "HIGH". Controlled by the signals Z0 and Z1 the demultiplexer D0 (HIGH) distributes pulses over the lines TX1 to TX4 which, again in the right order, are connected to the inputs of the demultiplexers D1 to D4. The sixteen output signals of the demultiplexers D1 to D4 are buffered each in a separate flip-flop in order to suppress, for example, spikes and obtain jitterless signals. The block F1 comprises 8 flip-flops which are all clocked with the clock T311. The same holds for the block F2.

The demultiplexer D1 produces the clocks TL0, TL4, TL8 and TL12, the demultiplexer D2 the clocks TL1, TL5, TL9 and TL13, the demultiplexer D3 the clocks TL2, TL6, TL10 and TL14 and the demultiplexer D4 the clocks TL3, TL7, TL11 and TL15.

Figure 5:
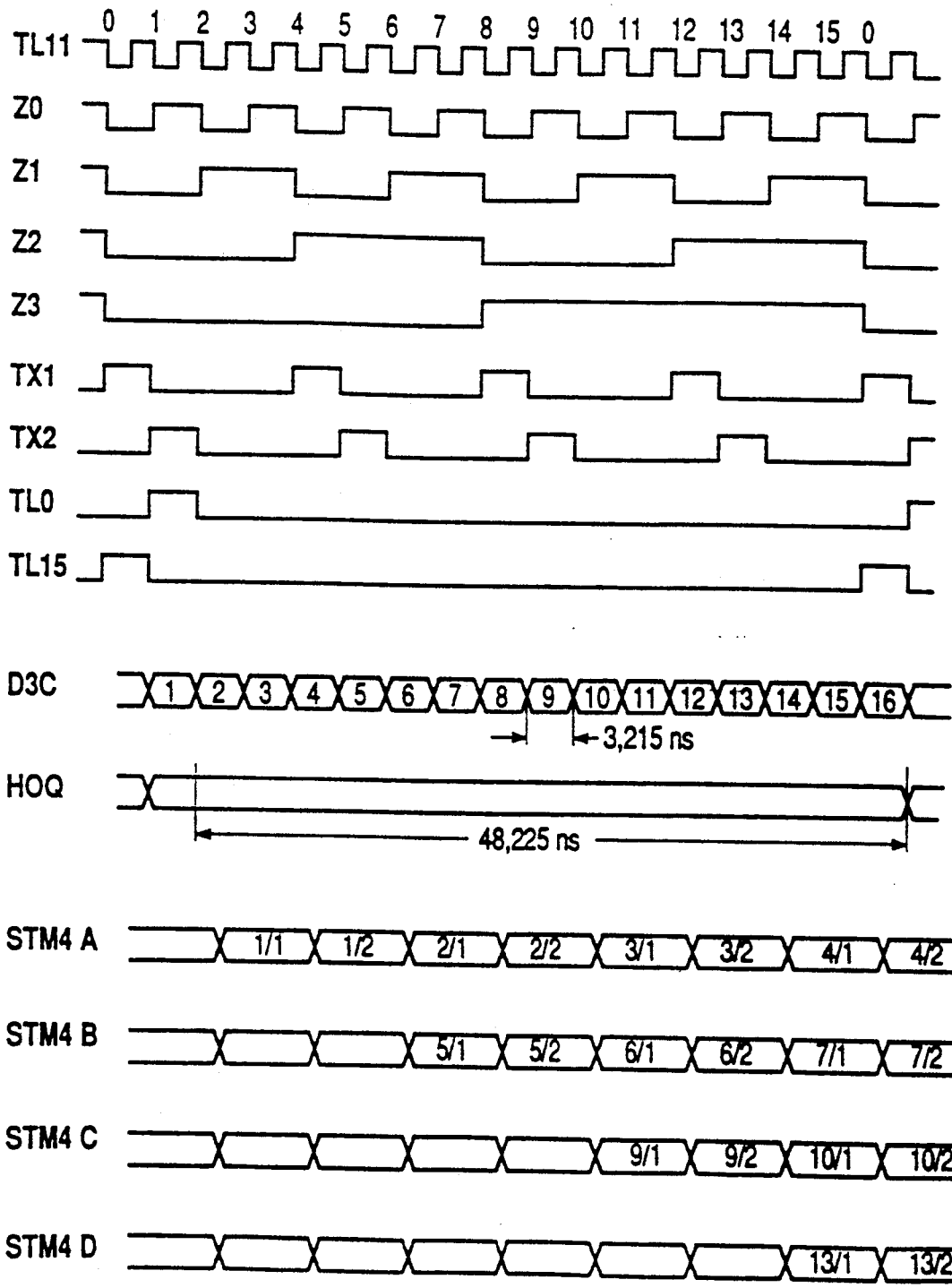
FIG. 5 shows the time diagram of further necessary clock and control signals as well as input and output signals.

In order to explain that the produced clocks are also the required clocks, FIG. 5 shows time diagrams of the most important control signals plotted along the same time axis. The pulse samples shown are repeated after sixteen count clocks for the four-stage counter CZ4. The count clock T311 is shown in the top time diagram of FIG. 5. All further clocks are derived from that clock.

Its descending edges by which the count of the counter CZ4 is incremented modulo-16, are numbered consecutively. Underneath the diagram of the count clock T311 are first shown the output signals Z(3:0) of the four stages of the counter CZ4. Then the intermediate signals TX1 and TX2 are shown which according to FIG. 4 are the output signals of the demultiplexer D0. The intermediate signals TX3 and TX4 are shifted relative to the signal TX2 by one or two periods of the clock T311 respectively, and thus not plotted in FIG. 5.

Similarly holds for the control signals TL1 to TL14 which are shifted relative to the clock TL0 by a further period of the clock T311. The last of these options, that is to say, clock TL15 is shown.

The next row diagrammatically shows the consecutively numbered bytes of the input signal D3C. The time indication of 3.315 ns holds for the STM16 signal.

The next diagram diagrammatically shows the signal H0Q at the Q-output of the latch H0. A change of the stored data is possible at the crosses; these points correspond to the ascending edges of the clock TL0. Because a latch is controlled by the amplitude of the clock signal, the data are stored in a stable fashion only within the two perpendicular marks, i.e. within a period of time of 48.225 ns for an STM16 signal.

The last four diagrams show the output signals STM4A to STM4D. Half bytes are denoted diagrammatically. The first digit denotes the number of the byte in the input signal D3C and the digit after the backslash denotes the first or second half byte. The signals are delayed relative to each other always by four periods of the clock T311.

We claim:

1. Demultiplexer for an isochronous multiplex signal that consists of isochronous sub-signals interleaved block by block, the demultiplexer comprising
    a read-write memory for storing the isochronous multiplex signal and
    a read-write control including
        a multi-stage cyclic counter (CZ4; FIG. 4) having a plurality of counter stages which have outputs (Z(3:0)) coupled to control inputs of the read-write memory (MXA, MXB, MXC, MXD),
        a plurality of addressable demultiplexers (D0 to D4;FIG. 4) having address inputs coupled to the outputs of the counter stages and having outputs coupled to further control inputs of the read-write memory.

2. The demultiplexer of claim 1 wherein the counter counts clock pulses.

3. The demultiplexer of claim 1 wherein the control inputs, of the read/write memory, signal when certain bits of the isochronous multiplex signal are available to be transferred to outputs of the read/write memory.

4. The demultiplexer of claim 1 wherein the further control inputs, of the read/write memory, control timing of input of bits of the isochronous multiplex signal to the read/write memory.

5. The demultiplexer of claim 1 wherein the read/write memory comprises memory means for storing the isochronous multiplex signal and reading means for reading parts of the isochronous signal from the memory means in a demultiplexed form.

6. The demultiplexer of claim 5 wherein the memory means comprises latches (H0 to H3, FIG. 2) for storing the isochronous multiplex signal.

7. The demultiplexer of claim 6 wherein the further control inputs control timing of input of the isochronous multiplex signal to the latches.

8. The demultiplexer of claim 5 wherein the reading means comprises a distribution matrix coupled to an output of the memory means; and a plurality of addressable multiplexers (M0 to M3, MA; FIG. 2) having inputs coupled to outputs of the distribution matrix.

9. The demultiplexer of claim 8 wherein the control inputs control timing of input of data to the addressable multiplexers.

10. Demultiplexer for an isochronous multiplex signal that consists of isochronous sub-signals interleaved block by block, the demultiplexer comprising a) a read-write memory for storing the isochronous multiplex signal, the read-write memory comprising i) memory means, including latches (H0 to H3, FIG. 2), for storing the isochronous multiplex signal, and ii) reading means for reading parts of the isochronous signal from the memory means in a demultiplexed form, the reading means including A) a distribution matrix coupled to an output of the memory means; and B) a plurality of addressable multiplexers (M0 to M3, MA; FIG. 2) having inputs coupled to outputs of the distribution matrix; and b) a read-write control including i) a multi-stage cyclic counter (CZ4; FIG. 4) coupled to count clock pulses and having a plurality of counter stages, which counter stages have outputs (Z(3:0)) coupled to control inputs of the addressable multiplexers to control timing of transfer of data from the distribution matrix to the addressable multiplexers; and ii) a plurality of addressable demultiplexers (D0 to D4; FIG. 4) having address inputs coupled to the outputs of the counter stages and having outputs coupled to control inputs of the latches to control timing of input of the isochronous multiplex signal to the latches.

* * * * *